March 10, 1936.　　L. E. W. VAN ALBADA　　2,033,902
LENS STEREOSCOPE
Filed March 22, 1934
Fig. 1.
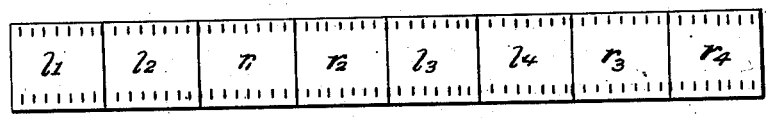
Fig. 2.
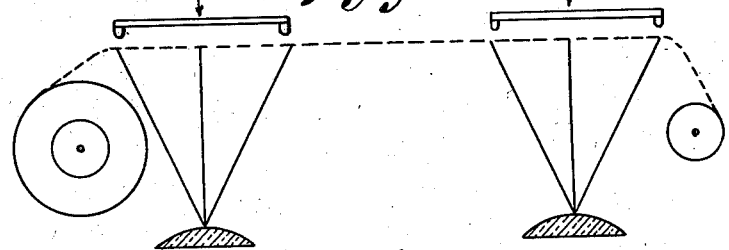
Fig. 3.
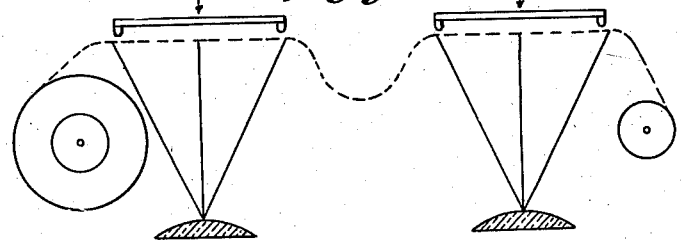
Fig. 4.
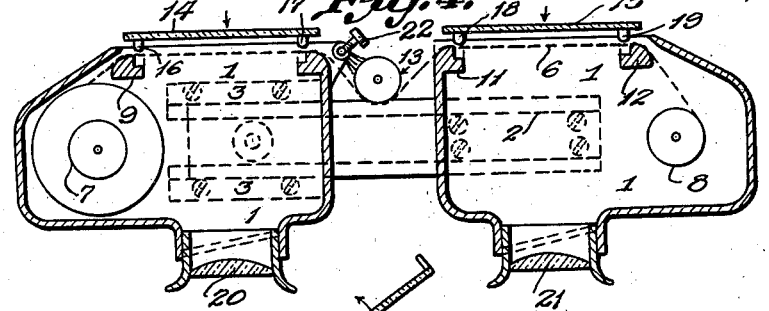
Fig. 5.
Inventor
Lieuwe E. W. Van Albada
by　Glenn C. Henman
　　Attorney.

Patented Mar. 10, 1936

2,033,902

UNITED STATES PATENT OFFICE 2,033,902

LENS-STEREOSCOPE

Lieuwe E. W. van Albada, Bloemendaal, Netherlands

Application March 22, 1934, Serial No. 716,861

4 Claims. (Cl. 88—29)

There are several disadvantages of the usual methods in viewing stereoscopic pictures in the facts that:

1. The two images of a stereoscopic picture are so fixed to each other on glass or on pasteboard, that their mutual distance is invariable;

2. In the numerous cases, that the said distance is not exactly equal to that of the observer's eyes, his eyes are obliged to look eccentrically and differently through the, mostly single, lenses of the stereoscope and in consequence thereof a symmetrical instead of at least a congruent distortion of the image arises and often also an insurmountable divergence or other difficulties in fusing the two images, especially when short-focus lenses are used;

3. The usual methods of printing neither warrant exactly equal distance between nor exactly equal height of corresponding distant points in both images.

Now it is known, that dividing the stereoscopic picture in two separated images these images can be fixed separately and moved sideways to suit the observer's eye-distance, but this method has the inconveniences that the left and the right image easily are confounded, that they are put on different heights, not exactly parallel, or get separated and lost among other images.

The following method avoids these inconveniences.

Fig. 1 illustrates a picture film carrying the stereoscopic pictures arranged according to my invention.

Fig. 2 illustrates diagrammatically the parallel lens-axes at the greatest distance from one another with the image centers on the flat stretched film.

Fig. 3 is a view similar to Figure 2 with the two halves of the stereoscopic apparatus moved toward one another to suit the eyes of the observer.

Fig. 4 shows a horizontal section through the lens axis of a stereoscope.

Fig. 5 shows a vertical section through the lens axis of a stereoscope.

The stereoscopic pictures are taken preferably on a normal moving-picture-film led horizontally in a stereoscopic camera like in an ordinary rollfilm-camera.

Each of the two images of a stereoscopic picture occupies a space limited by a certain number of holes of the perforation, f. i. 8 of a normal film, whilst the centers of the two images have a distance of 16 holes from each other, that is to say nearly equal to the greatest distance of human eyes.

The space between the two images, in this case having also a length of 8 holes is advantageously occupied by one of the images of the next or of the preceding stereoscopic picture as shown in Fig. 1, where the left images are indicated with $l_1$, $l_2$ etc. and the right ones with $r_1$, $r_2$ etc., the images $l_1$ and $r_1$, belonging to the first, $l_2$ and $r_2$ to the second stereoscopic picture etc.

Now it is of the greatest importance that, in viewing these pictures in the stereoscope, the centers of the two images, the centers of the stereoscope-lenses and the centers of the observers eyes have the same distance from each other and are situated on the parallel axes of the stereoscope-lenses, especially in the case that the focal length of the stereoscope-lenses is very short, f. i. 1½ inch.

This can be obtained in the following way.

The lens-stereoscope is so constructed, that its two halves can be moved parallelly sideways. At the greatest distance from each other the parallel lens-axes are exactly so far separated as the corresponding image-centers on the flat stretched film, as shown in Fig. 2.

When rolling up the film now till one image has the right position the corresponding image must be also on its right place. Now the two images are pressed flat and fixed to these places and after this the two halves of the stereoscope can be moved to each other till they suit the observer's eyes best; Fig. 3.

Under the two bottoms 1 are means to shove the two casings at a desired distance to or from each other f. i. by a swallowtail-construction 2 and 3. A screw 4 enables to fix the two casings, when required, but ordinarily it is out of use.

After elongating the distance of the two casings to its maximum, according to Fig. 2, the two casings are opened by lifting up a cover 5 (Fig. 5) with turning joint, so that the rollfilm 6, (or the flexible joined pair of stereoscopic images) can be put in, the two rolls on their axis 7 and 8, and the film behind the round edged columns 9, 10, 11, and 12, and before the free turning roll 13, which is feebly pressed inward by a spiral spring (not visible in the drawing).

Now the opal glassdoors 14 and 15, each provided with two teeth 16, 17, 18, and 19, are shut, so that the teeth pierce through the corresponding holes in the film and the columns, fixing the two images to their right places. Also the covers are shut keeping at the same time the opal glass doors.

Now the stereoscope is ready to be used by successive persons, even by children, whatever may be the intervals of their eyes.

For persons with normal eyes, or with eyes normalized by spectacles, the eye-pieces can stay fixedly at focal distance from the picture. But to correct small anomalies of the eyes the distance of the eye-pieces from the pictures is slightly variable, as usual with binocles.

If there is only one person to view successive stereoscopic pictures the two casings are fixed by the screw 4 at the desired distance and the roll 13, stretching the filmloop, is fixed in this position by a screw 22.

I claim:

1. A lens stereoscope consisting of two symmetrical, at variable distances parallely adjustable halves, each of which contains an eye-piece, so fixed to an imageholder in its focal plane, that the lens axis pointing perpendicularly to the center of the imageholder and only the distance between lens and imageholder is slightly variable, means to adjust the two halves along parallel axes to and from each other, the said stereoscope combined with suitable stereoscopic pictures, the two images of which are parallely joined together by a streak of thin flexible material, large enough to form a loop of variable wideness between them, means to fix each image so to its holder, that its plane and center coincide with those of the holder.

2. A lens stereoscope consisting of two symmetrical, at variable distances parallely adjustable halves, each of which contains an eye-piece, so fixed to an imageholder in its focal plane, that the lens axis is pointing perpendicularly to the center of the imageholder and only the distance between lens and imageholder is slightly variable, means to adjust the two halves along parallel axes to and from each other, means for guiding and rolling up a rollfilm-band with a series of suitable stereoscopic pictures, the two images of which are separated by a space of the said film large enough to form a loop of variable wideness, horizontally along the plane of the two imageholders and means for fixing the two images centrically to their corresponding imageholders.

3. A lens stereoscope consisting of two symmetrical, at variable distances parallely adjustable halves, each of which contains an eye-piece, so fixed to an imageholder in its focal plane, that the lens axis is pointing perpendicularly to the center of the imageholder and only the distance between lens and imageholder is slightly variable, means to adjust the two halves along parallel axes to and from each other, means for guiding and rolling up a rollfilm-band with a series of suitable stereoscopic pictures, the two images of which are separated by one of the images of the preceding or following picture, horizontally along the plane of the two imageholders and means to fix the two images centrically to their corresponding imageholders.

4. A lens stereoscope consisting of two symmetrical, at variable distances parallely adjustable halves, each of which contains an eye-piece, so fixed to an imageholder in its focal plane, that the lens axis is pointing perpendicularly to the center of the imageholder and only the distance between lens and imageholder is slightly variable, means for guiding and rolling up a rollfilm-band with a series of suitable stereoscopic pictures, the two images of which are separated by one of the images of the preceding or following picture, horizontally along the plane of the two imageholders, means to fix the two images centrically to their corresponding imageholders, means for fixing the stereoscope-halves at a desirable distance from each other, and means for keeping the loop between the said images at a constant wideness and stretching it during the transport of the filmband.

LIEUWE E. W. van ALBADA.